United States Patent [19]
Kameda

[11] Patent Number: 5,029,046
[45] Date of Patent: Jul. 2, 1991

[54] ILLUMINATED INDICATOR GAUGE

[75] Inventor: Tsuyoshi Kameda, Saitama, Japan

[73] Assignee: Kanto Seiki Co., Ltd., Omiya, Japan

[21] Appl. No.: 443,332

[22] Filed: Dec. 1, 1989

[30] Foreign Application Priority Data

Dec. 27, 1988 [JP] Japan .......................... 63-168746[U]
Dec. 27, 1988 [JP] Japan .......................... 63-168747[U]
Dec. 27, 1988 [JP] Japan .......................... 63-168748[U]
Dec. 27, 1988 [JP] Japan .......................... 63-168749[U]
Dec. 27, 1988 [JP] Japan .......................... 63-168750[U]

[51] Int. Cl.$^5$ ............................................ G01D 11/28
[52] U.S. Cl. ...................................... 362/28; 362/84;
362/293; 116/DIG. 36
[58] Field of Search ...................... 362/23, 28, 29, 30,
362/84, 231, 268, 293, 330, 331; 40/546, 556;
116/DIG. 35, 36, 202; 350/311, 313

[56] References Cited
U.S. PATENT DOCUMENTS 3,267,598  8/1966  Olesen et al. ....................... 40/546
4,841,155  6/1989  Ushida et al. ...................... 362/84
4,845,595  7/1989  Fujii et al. ........................... 362/23
4,882,659 11/1989  Gloudemans ....................... 362/61
4,975,807 12/1990  Oharhi ................................. 362/28

FOREIGN PATENT DOCUMENTS 2464856  3/1981  France .
2526736 11/1983  France .

Primary Examiner—Ira S. Lazarus
Assistant Examiner—D. M. Cox
Attorney, Agent, or Firm—Foley & Lardner

[57] ABSTRACT

An indicator gauge is disclosed, which comprises a meter panel. The meter panel includes a transparent base plate, a transparent colored layer applied to a rear surface of the transparent base platen and a fluorescent transparent substance layer applied to a front surface of the transparent base plate. A visual alarm indicator includes an opaque mark mounted to a given portion of the meter panel, a lamp housing having an open end which is connected to a rear surface of the meter panel in such a manner as to face toward the given portion and an electric lamp installed in the lamp housing. An ultraviolet lamp is arranged in front of the meter panel and generates ultraviolet rays upon electric energization thereof.

15 Claims, 2 Drawing Sheets

ILLUMINATED INDICATOR GAUGE

BACKGROUND OF THE INVENTION

1. Field of the Invention

The present invention relates in general to illuminated indicator gauges used, for example, as speedometers and tachometers for a motor vehicle or the like, and more particularly to such gauges of a type which has a visual alarm indicator.

2. Description of the Prior Art

In order to clarify the task of the present invention, one conventional gauge of the above-mentioned type will be described with reference to FIGS. 3 and 4 of the accompanying drawings.

As is seen from FIG. 3, the gauge comprises a meter panel 1 formed with circular openings 3a and 3b which have respective dial boards 2a and 2b received therein. The meter panel 1 has further two visual alarm indicators 4a and 4b mounted thereto and a turning direction indicator 5 mounted thereto.

FIG. 4 shows in detail the meter panel 1 and each of the visual alarm indicators 4a and 4b mounted to the meter panel 1.

The meter panel 1 comprises a transparent base plate 1a made of a rigid plastic, such as polycarbonate or the like, a transparent coloured layer 1b printed on a back surface of the base plate 1a and a smoked layer 1c printed on a front surface of the base plate 1a. The layer 1b is usually coloured red, blue or yellow. A fluorescent transparent substance layer 1d is coated on the smoked layer 1c except the portions with which the visual alarm indicators 4a and 4b and the turning direction indicator 5 are associated. As is known, the fluorescent substance layer 1d emits visible and visionary light under the action of ultraviolet rays. An electric ultraviolet lamp 10 is arranged in front of the meter panel 1.

Each visual alarm indicator 4a or 4b comprises various opaque marks 1e printed on the smoked layer 1c, lamp housings 6 each having an open end connected to the back surface of the meter panel 1 at the position where the corresponding mark 1e is located, and alarm electric lamps 7 respectively installed in the lamp housings 6.

Thus, when one of the alarm lamps 7 is energized to light upon sensing any trouble of the vehicle, the limited surrounding of the corresponding opaque mark 1e is illuminated to emphasize the mark 1e. With this, a viewer, that is, a driver, can recognize the vehicle trouble.

Of course, none of the alarm lamps 7 lights when the vehicle is in order.

However, due to its inherent construction, the conventional gauge has the following drawbacks.

That is, when, at night, the front surface (that is, the fluorescent substance layer 1e) of the meter panel 1 is visionally illuminated under the action of ultraviolet rays from the ultraviolet lamp 10, the portions of the meter panel 1 where the visual alarm indicators 4a and 4b are positioned appear dark. This phenomenon makes the external view of the illuminated meter panel 1 poor. Furthermore, the difference in brightness between the illuminated portion of the meter panel 1 and the non-illuminated portions of the same sometimes causes difficulties to arise in clearly and quickly reading the indicia on the dial boards 2a and 2b.

SUMMARY OF THE INVENTION

It is therefore an object of the present invention to provide an illuminated indicator gauge which is free of the above-mentioned drawbacks.

According to the present invention, there is provided an indicator gauge which comprises a meter panel, the meter panel including a transparent base plate, a transparent coloured layer applied to a rear surface of the transparent base plate and a fluorescent transparent substance layer applied to a front surface of the transparent base plate; a visual alarm indicator including an opaque mark mounted to a given portion of the meter panel, a lamp housing having an open end which is connected to a rear surface of the meter panel in such a manner as to face toward the given portion and an electric lamp installed in the lamp housing; and an ultraviolet lamp arranged in front of the meter panel and generating ultraviolet rays upon electric energization thereof.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

Figure 1:
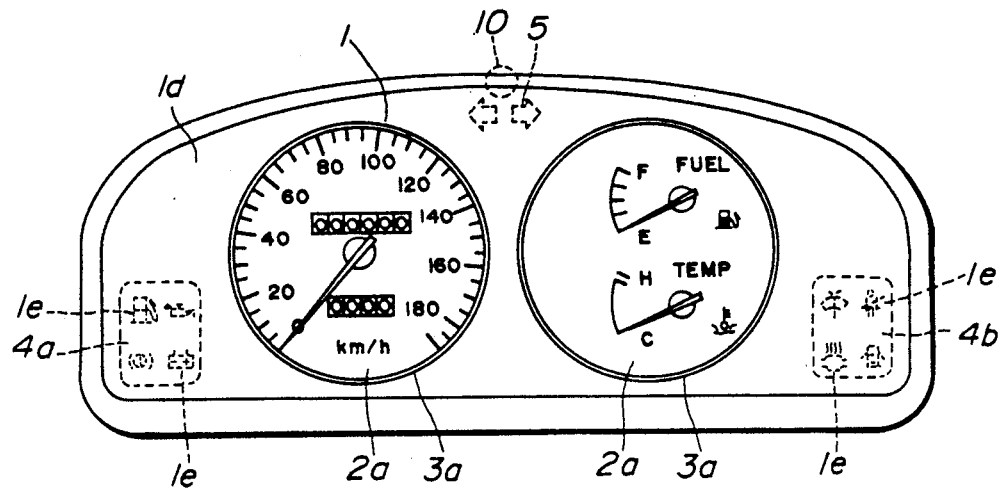
FIG. 1 is a front view of an illuminated indicator gauge according to the present invention.

Referring to FIG. 1, there is shown an illuminated indicator gauge of the present invention.

Similar to the above-mentioned conventional one, the gauge of the invention comprises generally a meter panel 1 formed with circular openings 3a and 3b which have respective dial boards 2a and 2b received therein. The meter panel 1 has further two visual alarm indicators 4a and 4b mounted thereto and a turning direction indicator 5 mounted thereto. An electric ultraviolet lamp 10 is arranged in front of the meter panel 1.

Figure 2A:
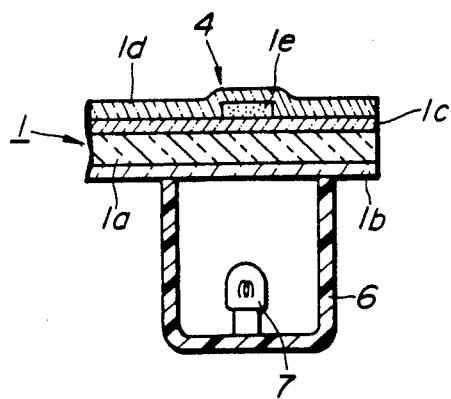
FIG. 2A is a sectional view of a visual alarm indicator which is used in a first embodiment of the illuminated indicator gauge of the present invention.

FIG. 2A shows in detail the meter panel 1 and each of the visual alarm indicators 4a and 4b, which are employed in a first embodiment of the present invention.

The meter panel 1 comprises a transparent base plate 1a made of a rigid plastic such as polycarbonate or the like, a transparent coloured layer 1b printed on a back surface of the base plate 1a and a smoked layer 1c printed on a front surface of the base plate 1a.

Each visual alarm indicator 4a or 4b comprises various opaque marks 1e printed on the smoked layer 1c, lamp housings 6 each having an open end connected to the back surface of the meter panel 1 at the position where the corresponding mark 1e is located, and electric alarm lamps 7 respectively received in the lamp housings 6.

In this first embodiment, a fluorescent transparent substance layer 1d is coated on the opaque marks 1e as well as the smoked layer 1c, and the opaque marks 1e are made of a suitable light reflecting paint.

Thus, when one of the alarm lamps 7 is energized to light upon sensing any trouble of the vehicle, the limited surrounding of the corresponding opaque mark 1e is illuminated to emphasize the mark 1e.

Table-I shows the visibility of each mark 1e and the limited surrounding of the mark 1e which are exhibited when the corresponding alarm lamp 7 is ON and OFF in day time and night time.

As is seen from the table, in day time with the alarm lamp 7 being OFF, the entire outer surface of the meter panel 1, which includes the surfaces for the visual alarm indicators 4a and 4b, shows the colour of the smoked layer 1c, and only the marks 1e are illuminated white due to reflection of natural light. When one alarm lamp 7 is lit, the limited surrounding of the corresponding mark 1e is illuminated with a colour possessed by the transparent coloured layer 1b, and the mark 1e is shown like a silhouette (dark).

In night time with the alarm lamp 7 being OFF, the entire outer surface of the meter panel 1, which includes the surfaces for the visual alarm indicators 4a and 4b, is visionally illuminated under the action of the ultraviolet rays from the ultraviolet lamp 10, and the marks 1e are visionally illuminated with a colour possessed thereby. When one alarm lamp 7 is lit, the limited surrounding of the corresponding mark 1e is illuminated with a colour which is provided by the combination of the colour of the fluorescent transparent substance layer 1d and the colour of the transparent coloured layer 1b, and the mark 1e is shown like a silhouette (dark).

Figure 2B:
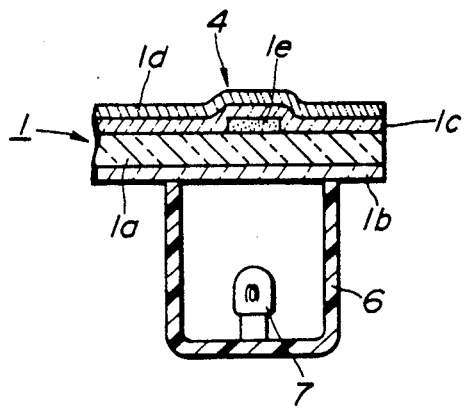
FIG. 2B is a view similar to FIG. 2A, but showing an alarm indicator employed in a second embodiment.

Referring to FIG. 2B, there is shown a visual alarm indicator 4a or 4b which is employed in a second embodiment of the invention.

In this second embodiment, opaque marks 1e made of a suitable light reflecting white paint are printed on a front surface of the transparent base plate 1a, and a smoked layer 1c is coated on the opaque marks 1e as well as the front surface of the base plate 1a. A fluorescent transparent substance layer 1d is coated on the smoked layer 1c.

Table-II shows the visibility of each mark 1e and the limited surrounding of the mark 1e which are exhibited when the corresponding alarm lamp 7 is ON and OFF in day time and night time.

As is seen from the table, in day time with the alarm lamp 7 being OFF, the entire outer surface of the meter panel 1, which includes the surfaces for the visual alarm indicators 4a and 4b, shows the colour of the smoked layer 1c, and only the marks 1e are illuminated with a colour (gray) which is provided by the combination of the colour of the white marks 1e and the colour of the smoked layer 1c due to reflection of natural light. When one alarm lamp 7 is lit, the limited surrounding of the corresponding mark 1e is illuminated with a colour possessed by the transparent coloured layer 1b, and the mark 1e is shown like a silhouette (dark).

In night time with the alarm lamp 7 being OFF, the entire outer surface of the meter panel 1, which includes the surfaces for the visual alarm indicators 4a and 4b, is visionally illuminated under the action of the ultraviolet rays from the ultraviolet lamp 10, and the marks 1e are out of sight. When one alarm lamp 7 is lit, the limited surrounding of the corresponding mark 1e is illuminated with a colour which is provided by the combination of the colour of the fluorescent transparent substance layer 1d and the colour of the transparent coloured layer 1b, and the mark 1e is shown like a silhouette (dark).

Figure 2C:
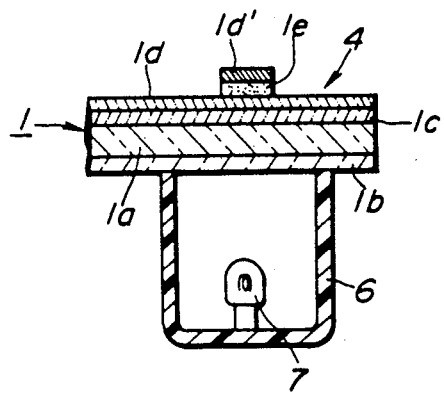
FIG. 2C is a view also similar to FIG. 2A, but showing an alarm indicator employed in a third embodiment.

Referring to FIG. 2C, there is shown a visual alarm indicator 4a or 4b which is employed in a third embodiment of the present invention.

In this third embodiment, a smoked layer 1c is coated on the entire outer surface of the transparent base plate 1a. A fluorescent transparent substance layer 1d is coated on the entire outer surface of the smoked layer 1c. Opaque marks 1e made of a white paint are printed on an outer surface of the fluorescent layer 1d. Each mark 1e is coated with another fluorescent transparent substance layer 1d' which emits light whose colour is different from that of the above-mentioned fluorescent layer 1d.

Table-III shows the visibility of each mark 1e and the limited surrounding of the mark 1e which are exhibited when the corresponding alarm lamp 7 is ON and OFF in day time and night time.

As is seen from the table, in day time with the alarm lamp 7 being OFF, substantially entire outer surface of the meter panel 1, which includes the surfaces for the limited surrounds of the marks 1e, shows the colour of the smoked layer 1c, and only the marks 1e are illuminated white due to reflection of natural light. When one alarm lamp 7 is lit, the limited surrounding of the corresponding mark 1e is illuminated with a colour possessed by the transparent coloured layer 1b and the mark 1e is shown like a silhouette (dark).

In night time with the alarm lamp 7 being OFF, the entire outer surface of the meter panel 1, which includes the surfaces for the visual alarm indicators 4a and 4b, is visionally illuminated under the action of the ultraviolet rays from the ultraviolet lamp 10, and the marks 1e are also visionally illuminated with a different colour. When one alarm lamp 7 is lit, the limited surrounding of the corresponding mark 1e is illuminated with a colour which is provided by the combination of the colour of the fluorescent transparent substance layer 1d and the colour of the transparent coloured layer 1b, and the mark 1e is kept illuminated with the different colour.

Figure 2D:
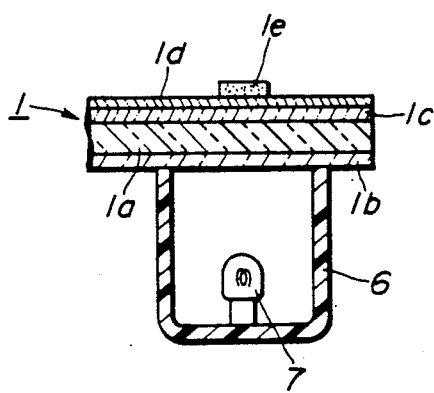
FIG. 2D is a view also similar to FIG. 2A, but showing an alarm indicator employed in a fourth embodiment.

Referring to FIG. 2D, there is shown a visual alarm indicator 4a or 4b which is employed in a fourth embodiment of the invention.

In the fourth embodiment, a smoked layer 1c is coated on the entire outer surface of the transparent base plate 1a. A fluorescent transparent substance layer 1d is coated on the entire outer surface of the smoked layer 1c. Opaque marks 1e made of a white paint are printed on an outer surface of the fluorescent layer 1d.

Table-IV shows the visibility of each mark 1e and the limited surrounding of the mark 1e which are exhibited when the corresponding alarm lamp 7 is ON and OFF in day time and night time.

As is seen from the table, in day time with the alarm lamp 7 being OFF, substantially entire outer surfaces of the meter panel 1, which includes the surfaces for the limited surroundings of the marks 1e, shows the colour of the smoked layer 1c, and only the marks 1e are illuminated white due to reflection of natural light. When one alarm lamp 7 is lit, the limited surrounding of the corresponding mark 1e is illuminated with a colour possessed by the transparent coloured layer 1b and the mark 1e is shown like a silhouette (dark).

In night time with the alarm lamp 7 being OFF, substantially entire outer surface of the meter panel 1, which includes the limited surroundings of the marks 1e, is visionally illuminated under the action of the ultraviolet rays from the ultraviolet lamp 10, and each mark 1e is shown like a silhouette (dark). When one alarm lamp 7 is lit, the limited surrounding of the corresponding mark 1e is illuminated with a colour which is provided by the combination of the colour of the fluorescent transparent substance layer 1d and the colour of the transparent coloured layer 1b, and the mark 1e is shown like a silhouette (dark).

Figure 2E:
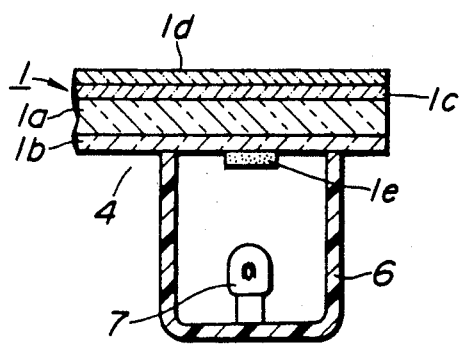
FIG. 2E is a view also similar to FIG. 2A, but showing an alarm indicator employed in a fifth embodiment.

Referring to FIG. 2E, there is shown a visual alarm indicator 4a or 4b which is employed in a fifth embodiment of the invention.

In this fifth embodiment, opaque marks 1e made of a suitable light blocking paint are printed on the exposed surface of the transparent coloured layer 1b which is printed on the back surface of the transparent base plate 1a. A smoked layer 1c is coated on a front surface of the base plate 1a and a fluorescent transparent substance layer 1d is coated on the smoked layer 1c.

Table-V shows the visibility of each mark 1e and the limited surrounding of the mark 1e which are exhibited when the corresponding alarm lamp 7 is ON and OFF in day time and night time.

As is seen from the table, in day time with the alarm lamp 7 being OFF, the entire outer surface of the meter panel 1, which includes the surfaces for the visual alarm indicators 4a and 4b, shows the colour of the smoked layer 1c and the marks 1e are out of sight. When one alarm lamp 7 is lit, the limited surrounding of the corresponding mark 1e is illuminated with a colour possessed by the transparent coloured layer 1b, and the mark 1e is shown like a silhouette (dark).

In night time with the alarm lamp 7 being OFF, the entire outer surface of the meter panel 1, which includes the surfaces for the visual alarm indicators 4a and 4b, is visionally illuminated under the action of the ultraviolet rays from the ultraviolet lamp 10, and the marks 1e are out of sight. When one alarm lamp 7 is lit, the limited surrounding of the corresponding mark 1e is illuminated with a colour which is provided by the combination of the colour of the fluorescent transparent substance layer 1d and the colour of the transparent coloured layer 1b, and the mark 1e is shown like a silhouette (dark).

Figure 2F:
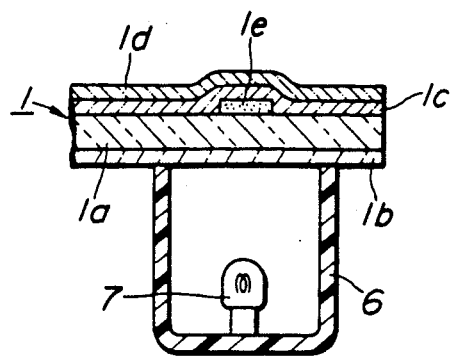
FIG. 2F is a view also similar to FIG. 2A, but showing an alarm indicator employed in a sixth embodiment.

Referring to FIG. 2F, there is shown a visual alarm indicator 4a or 4b employed in a sixth embodiment of the present invention.

The indicator in this embodiment is substantially the same as that in the second embodiment (FIG. 2B), except for the marks 1e. That is, the marks 1e in the sixth embodiment are made of a light blocking paint.

Thus, the visibility of each mark 1e and the limited surrounding of the mark 1e of this sixth embodiment are substantially the same as those of the second embodiment.

As will be understood from the going description, the illuminated indicator gauge of the present invention has the following advantageous features.

Figure 3:
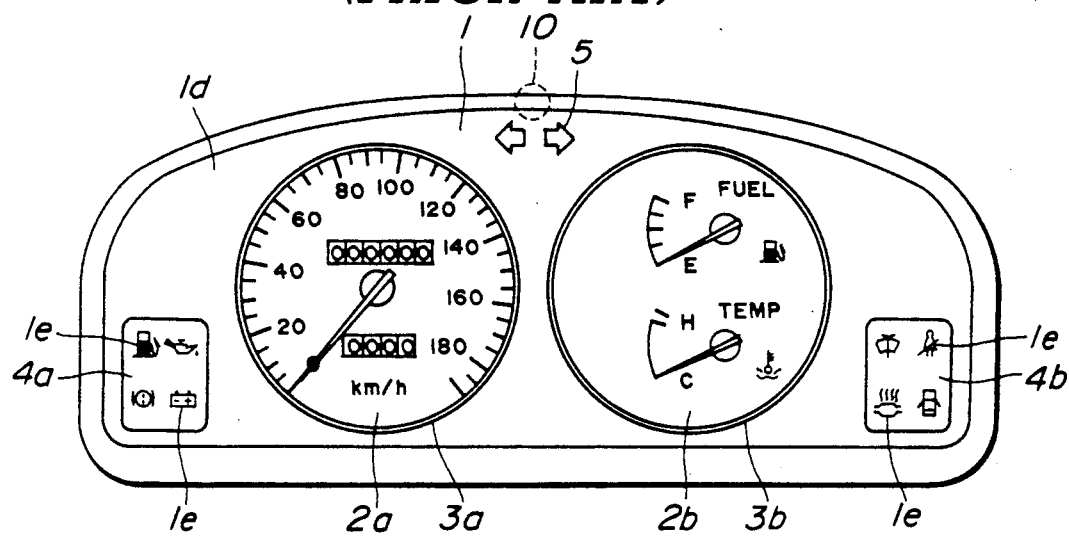
FIGS. 3 and 4 show a conventional illuminated indicator gauge.
Figure 4:
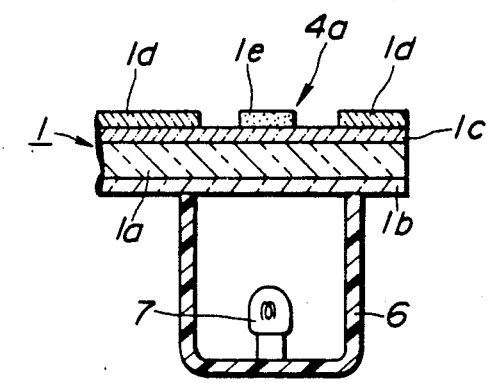

That is, in night time, the substantially entire outer surface of the metal panel 1, which includes the surfaces for the visual alarm indicators 4a and 4b, is illuminated evenly by the action of the ultraviolet rays from the ultraviolet lamp 10, unlike in the case of the afore-mentioned conventional gauge of FIGS. 3 and 4. That is, in the invention, the unsightly non-illuminated portions which would be caused by provision of the visual alarm indicators 4a and 4b do not appear on the illuminated meter panel 1. This improves the external view of the panel 1. For the same reason, clear and quick reading of the indicia on the dial boards 2a and 2b is assured in the invention.

TABLE I

|  |  | Alarm lamp (7) | |
|---|---|---|---|
|  |  | OFF | ON |
| Mark (1e) | Day Time | Whity | Dark (Silhouette) |
|  | Night Time | Visionally Illuminated | Dark (Silhouette) |
| Limited Surrounding of Mark (1e) | Day Time | Colour of Smoked Layer | Red, Blue, Yellow etc., |
|  | Night Time | Visionally Illuminated | Red, Blue, Yellow etc., |

TABLE II

|  |  | Alarm lamp (7) | |
|---|---|---|---|
|  |  | OFF | ON |
| Mark (1e) | Day Time | Glay | Dark (Silhouette) |
|  | Night Time | Out of Sight | Dark (Silhouette) |
| Limited Surrounding of Mark (1e) | Day Time | Colour of Smoked Layer | Red, Blue, Yellow etc., |
|  | Night Time | Visionally Illuminated | Red, Blue, Yellow etc., |

TABLE III

|  |  | Alarm lamp (7) | |
|---|---|---|---|
|  |  | OFF | ON |
| Mark (1e) | Day Time | Whity | Dark (Silhouette) |
|  | Night Time | Visionally Illuminated | Dark (Silhouette) |
| Limited Surrounding of Mark (1e) | Day Time | Colour of Smoked Layer | Red, Blue, Yellow etc., |
|  | Night Time | Visionally Illuminated | Red, Blue, Yellow etc., |

TABLE IV

|  |  | Alarm lamp (7) | |
|---|---|---|---|
|  |  | OFF | ON |
| Mark (1e) | Day Time | Whity | Dark (Silhouette) |
|  | Night Time | Dark (Silhouette) | Dark (Silhouette) |
| Limited Surrounding of Mark (1e) | Day Time | Colour of Smoked Layer | Red, Blue, Yellow etc., |
|  | Night Time | Visionally Illuminated | Red, Blue, Yellow etc., |

TABLE V

|  |  | Alarm lamp (7) | |
|---|---|---|---|
|  |  | OFF | ON |
| Mark (1e) | Day Time | Out of sight | Dark (Silhouette) |
|  | Night Time | Out of sight | Dark (Silhouette) |
| Limited Surrounding of Mark (1e) | Day Time | Dark (Colour of Smoked Layer) | Red, Blue, Yellow etc., |
|  | Night Time | Visionally Illuminated | Red, Blue, Yellow etc., |

What is claimed is:

1. An indicator gauge comprising:

a meter panel; said meter panel including a transparent base plate, a transparent coloured layer applied to a rear surface of said transparent base plate and a fluorescent transparent substance layer applied to a front surface of said transparent base plate;

a visual alarm indicator including an opaque mark mounted to a given portion of said meter panel, a lamp housing having an open end which is connected to a rear surface of said meter panel in such a manner as to face toward said given portion and an electric lamp installed in said lamp housing;

a smoked layer interposed between the front surface of said transparent base plate and said fluorescent transparent substance layer;

an ultraviolet lamp arranged in front of said meter panel and generating ultraviolet rays upon electric energization thereof; and wherein said opaque mark is disposed between said smoked layer and said fluorescent substance layer.

2. An indicator gauge as claimed in claim 1, wherein said opaque mark is disposed on said fluorescent transparent substance layer.

3. An indicator gauge as claimed in claim 1, in which said opaque mark is made of a light blocking paint.

4. An indicator gauge as claimed in claim 2, in which said opaque mark is made of a light reflecting white paint.

5. An indicator gauge comprising:
a meter panel; said meter panel including a transparent base plate, a transparent coloured layer applied to a rear surface of said transparent base plate and a fluorescent transparent substance layer applied to a front surface of said transparent base plate;

a visual alarm indicator including an opaque mark mounted to a given portion of said meter panel, a lamp housing having an open end which is connected to a rear surface of said meter panel in such a manner as to face toward said given portion and an electric lamp installed in said lamp housing;

a smoked layer interposed between the front surface of said transparent base plate and said fluorescent transparent substance layer;

an ultraviolet lamp arranged in front of said meter panel and generating ultraviolet rays upon electric energization thereof; and wherein said opaque mark is disposed between said transparent base plate and said smoked layer.

6. An indicator gauge as claimed in claim 5, in which said opaque mark is made of a light reflecting white paint.

7. An indicator gauge comprising:
a meter panel; said meter panel including a transparent base plate, a transparent coloured layer applied to a rear surface of said transparent base plate and a fluorescent transparent substance layer applied to a front surface of said transparent base plate;

a visual alarm indicator including an opaque mark mounted to a given portion of said meter panel, a lamp housing having an open end which is connected to a rear surface of said meter panel in such a manner as to face toward said given portion and an electric lamp installed in said lamp housing;

a smoked layer interposed between the front surface of said transparent base plate and said fluorescent transparent substance layer;

an ultraviolet lamp arranged in front of said meter panel and generating ultraviolet rays upon electric energization thereof; and wherein said opaque mark is applied at its outer surface with another fluorescent transparent substance layer.

8. An indicator gauge as claimed in claim 7, in which said opaque mark is made of a light reflecting white paint.

9. An indicator gauge comprising:
a meter panel; said meter panel including a transparent base plate, a transparent coloured layer applied to a rear surface of said transparent base plate and a fluorescent transparent substance layer applied to a front surface of said transparent base plate;

a visual alarm indicator including an opaque mark mounted to a given portion of said meter panel, a lamp housing having an open end which is connected to a rear toward said given portion and an electric lamp installed in said lamp housing;

a smoked layer interposed between the front surface of said transparent base plate and said fluorescent transparent substance layer;

an ultraviolet lamp arranged in front of said meter panel and generating ultraviolet rays upon electric energization thereof;

wherein said opaque mark is disposed on said fluorescent transparent substance layer; and wherein said opaque mark is applied at its outer surface with another fluorescent transparent substance layer.

10. An indicator gauge as claimed in claim 9, in which said opaque mark is made of a light reflecting white paint.

11. An indicator gauge comprising:
a meter panel including a transparent base plate, a transparent coloured layer applied to a rear surface of said transparent base plate and a fluorescent transparent substance layer applied to a front surface of said transparent base plate, said meter panel being formed with an opening in which a dial board is installed;

a visual alarm indicator including an opaque mark mounted to a given portion of said meter panel, a lamp housing having an open end which is connected to a rear surface of said meter panel in such a manner as to face toward said given portion and an electric lamp installed in said lamp housing;

a smoked layer interposed between the front surface of said transparent base plate and said fluorescent transparent substance layer;

an ultraviolet lamp arranged in front of said meter panel and generating ultraviolet rays upon electric energization thereof; and wherein aid opaque mark is disposed between said smoked layer and said fluorescent substance layer.

12. An indicator gauge as claimed in claim 11, wherein said opaque mark is disposed on said fluorescent transparent substance layer.

13. An indicator gauge comprising:
a meter panel including a transparent base plate, a transparent coloured layer applied to a rear surface of said transparent base plate and a fluorescent transparent substance layer applied to a front surface of said transparent base plate, said meter panel being formed with an opening in which a dial board is installed;

a visual alarm indicator including an opaque mark mounted to a given portion of said meter panel, a lamp housing having an open end which is connected to a rear surface of said meter panel in such a manner as to face toward said given portion and an electric lamp installed in said lamp housing;

a smoked layer interposed between the front surface of said transparent base plate and said fluorescent transparent substance layer;

an ultraviolet lamp arranged in front of said meter panel and generating ultraviolet rays upon electric energization thereof; and wherein said opaque mark is disposed between said transparent base plate and said smoked layer.

14. A gauge as claimed in claim 13, in which said opaque mark is made of a light blocking paint.

15. An indicator gauge comprising:

a meter panel including a transparent base plate, a transparent coloured layer applied to a rear surface of said transparent base plate and a fluorescent transparent substance layer applied to a front surface of said transparent base plate, said meter panel being formed with an opening in which a dial board is installed;

a visual alarm indicator including an opaque mark mounted to a given portion of said meter panel, a lamp housing having an open end which is connected to a rear surface of said meter panel in such a manner as to face toward said given portion and an electric lamp installed in said lamp housing;

a smoked layer interposed between the front surface of said transparent base plate and said fluorescent transparent substance layer;

an ultraviolet lamp arranged in front of said meter panel and generating ultraviolet rays upon electric energization thereof;

wherein said opaque mark is disposed on said fluorescent transparent substance layer; and wherein said opaque mark is applied at its outer surface with another fluorescent transparent substance layer.

* * * * *